(12) United States Patent
Kiel et al.

(10) Patent No.: US 7,660,322 B2
(45) Date of Patent: Feb. 9, 2010

(54) SHARED ADAPTER

(75) Inventors: Harvey G. Kiel, Rochester, MN (US);
Lee A. Sendelbach, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 927 days.

(21) Appl. No.: 10/733,754

(22) Filed: Dec. 11, 2003

(65) Prior Publication Data
US 2005/0129040 A1    Jun. 16, 2005

(51) Int. Cl.
*H04L 12/28* (2006.01)
(52) U.S. Cl. .................... 370/413; 711/173
(58) Field of Classification Search .......... 711/141, 711/173; 709/215; 710/5
See application file for complete search history.

(56) References Cited

U.S. PATENT DOCUMENTS

| | | | |
|---|---|---|---|
| 5,434,852 A | 7/1995 | La Porta et al. | |
| 5,564,040 A * | 10/1996 | Kubala | ....................... 711/173 |
| 5,956,714 A * | 9/1999 | Condon | ........................ 707/8 |
| 6,314,501 B1 * | 11/2001 | Gulick et al. | ................ 711/153 |
| 6,854,021 B1 * | 2/2005 | Schmidt et al. | ................ 710/5 |
| 2002/0029286 A1 * | 3/2002 | Gioquindo et al. | ......... 709/236 |
| 2003/0023826 A1 * | 1/2003 | McMichael et al. | ......... 711/173 |
| 2003/0079067 A1 * | 4/2003 | Schmidt | ....................... 710/48 |
| 2003/0149844 A1 * | 8/2003 | Duncan et al. | .............. 711/141 |
| 2003/0236852 A1 * | 12/2003 | Fernandes et al. | ............ 709/215 |
| 2004/0153853 A1 * | 8/2004 | Moriki et al. | ................. 714/43 |
| 2004/0202189 A1 * | 10/2004 | Arndt et al. | .................. 370/409 |

OTHER PUBLICATIONS

U.S. Appl. No. 2002/0129172 A1, Pub. Date: Sep. 12, 2002.
U.S. Appl. No. 2002/0091786 A1, Pub. Date: Jul. 11, 2002.
U.S. Appl. No. 2002/0156915 A1, Pub. Date: Oct. 24, 2002.
U.S. Appl. No. 2002/0029286 A1, Pub. Date: Mar. 7, 2002.

* cited by examiner

*Primary Examiner*—Chirag G Shah
*Assistant Examiner*—Otis L Thompson, Jr.
(74) *Attorney, Agent, or Firm*—Dugan & Dugan, PC

(57) ABSTRACT

In a first aspect, a first method is provided for sharing a multiple queue Ethernet adapter. The first method includes the steps of receiving a frame or packet in the adapter and determining whether the frame or packet is for one or more of a plurality of partitions that share the adapter. If the frame or packet is for one or more of the plurality of partitions that share the adapter, the method further includes (1) storing the frame or packet in an adapter cache memory; (2) determining one or more of the plurality of partitions to which the frame or packet is to be sent; and (3) transferring the frame or packet from the adapter cache memory to a receive queue of each of the one or more partitions to which the frame or packet is to be sent. Numerous other aspects are provided.

11 Claims, 5 Drawing Sheets

SHARED ADAPTER

FIELD OF THE INVENTION

The present invention relates generally to computer servers, and more particularly to methods and apparatus for sharing an Ethernet adapter within a computer server.

BACKGROUND

The speed of network connections (e.g., Ethernet connections) to which a computer server may be connected is increasing. For example, computer servers may be connected via a networking adapter (e.g., Ethernet adapter) to Ethernet connections of 100 Mbps, 1 Gbps or 10 Gbps. In an attempt to fully utilize such a high-speed connection to which a network device may be connected, networking adapters, such as a Peripheral Component Interconnect (PCI) adapter, have been improved. More specifically, the operating speed of a chip included in the adapter and/or the speed of the adapter has been increased. For example, a server connected to a 10 Gbps local area network (LAN) may include a PCI-X 10 Gbps Ethernet adapter for receiving frames or packets from the LAN and/or transmitting frames or packets to the LAN. However, such a server may include a single processor. Typically, a server with a single processor may not drive a 10 Gbps Ethernet adapter at full speed. Consequently, the number of processors that may be included in a server has been increased. Further, adapters which support multiple queues (e.g., transmit and/or receive queues) have been developed. A server, which includes multiple processors, may include such an adapter. While executing instructions, the processors may employ threads, each of which may use a queue. Therefore, each processor may use its own transmit and/or receive queue, for example, to transmit and/or receive frames or packets. Such a server may include an adapter that performs receive frame processing based on frame size or IP differentiated services parameters of the received frames. However, such an adapter is not optimally designed for use in a multiple logical partition (LPAR) server.

On a logically partitioned server, each logical partition uses either a portion of one physical processor, one physical processor or multiple physical processors. Each logical partition uses a portion of the server main memory. A Hypervisor is a firmware layer that divides up processors and main memory among multiple logical partitions. A Hypervisor can also provide a command response queue allowing the multiple partitions to communicate. The Hypervisor can support data copies between partition memory (registered memory by the operating system to allow data copies).

An adapter may transfer data to or from adapter memory (e.g., an adapter cache memory) from or into main memory (e.g., a portion of main memory allocated to serve as a partition memory), respectively. For example, a direct memory access (DMA) may be performed by the adapter to copy data to or from adapter memory (e.g., an adapter cache memory) from or into main memory (e.g., a portion of main memory allocated to serve as a partition memory), respectively. The DMA operation is performed by adapter hardware. The main server processor may not be involved in the DMA operation. Terms such as "DMA", "DMAing", "DMAed", etc., are used herein to represent the performance of a direct memory access (e.g., by the adapter). Terms such as "transfer", "transferring", "transferred", etc., as used herein, include "DMA", "DMAing", "DMAed", etc., respectively.

Other servers, which include multiple processors and an adapter, which supports multiple queues, may include multiple logical partitions. However, only one partition includes a transmit queue and a receive queue. For example, a hosting partition, which controls (e.g., owns) the adapter, may include the transmit and receive queues. Therefore, all frames or packets received by the server are received by a single partition (e.g., the hosting partition), which must perform a store-and-forward operation to route the frames or packets received to an appropriate partition (e.g., for processing). Because all frames or packets received by and/or transmitted from the server go through a single partition, the single partition may receive numerous interrupts from the adapter, copy numerous frames or packets to different partitions, and/or perform context switching between partitions. Such processing overhead of the single partition, which includes the transmit and receive queues, increases delays and processor utilization such that the speed at which the server drives the adapter is reduced, and therefore, the speed with which frames or packets may be received by and/or transmitted from the server is reduced.

Methods and apparatus are desired for sharing an Ethernet adapter among multiple logical partitions.

SUMMARY OF THE INVENTION

In a first aspect of the invention, a first method is provided for sharing a multiple queue Ethernet adapter. The first method includes the steps of receiving a frame or packet in the adapter and determining whether the frame or packet is for one or more of a plurality of partitions that share the adapter. If the frame or packet is for one or more of the plurality of partitions that share the adapter, the method further includes (1) storing the frame or packet in an adapter cache memory; (2) determining one or more of the plurality of partitions to which the frame or packet is to be sent; and (3) transferring the frame or packet from the adapter cache memory to a receive queue of each of the one or more partitions to which the frame or packet is to be sent.

In a second aspect of the invention, a second method is provided for sharing a multiple queue Ethernet adapter. The second method includes the step of determining whether one or more of a plurality of partitions have a frame or packet to transmit. If one or more of the plurality of partitions have a frame or packet to transmit, the method further includes (1) selecting a partition from the plurality of partitions that have a frame or packet to transmit; (2) transferring the frame or packet corresponding to the selected partition from a transmit queue of the selected partition to the adapter cache memory; and (3) transmitting the frame or packet from the adapter.

In a third aspect of the invention, a third method is provided for sharing a multiple queue Ethernet adapter. The third method includes the steps of (1) employing a receive queue and a transmit queue for each of a plurality of partitions included in a computer system; and (2) at least one of transferring a frame or packet from the transmit queue of one of the plurality of partitions to the adapter cache memory, and transferring a frame or packet from the adapter to the receive queue of one of the plurality of partitions.

In a fourth aspect of the invention, a fourth method is provided for configuring a plurality of partitions of a computer system to share a multiple queue Ethernet adapter. The fourth method includes the steps of (1) creating a new partition in the computer system; and (2) allowing the new partition to share the adapter with one or more other partitions of the computer system. Numerous other aspects are provided, as are systems, apparatus and computer program products in accordance with these other aspects of the invention. Each computer program product described herein may be carried by a medium readable by a computer (e.g., a carrier wave signal, a floppy disc, a compact disc, a DVD, a hard drive, a random access memory, etc.).

In a fifth aspect of the invention, a fifth method is provided for sharing a multiple queue Ethernet-protocol adapter within a multiple processor environment having multiple partitions. The fifth method includes the steps of (1) receiving a frame or packet in the adapter; and (2) determining whether the frame or packet is for one or more of a plurality of partitions that share the adapter.

Other features and aspects of the present invention will become more fully apparent from the following detailed description, the appended claims and the accompanying drawings.

DETAILED DESCRIPTION

Figure 1:
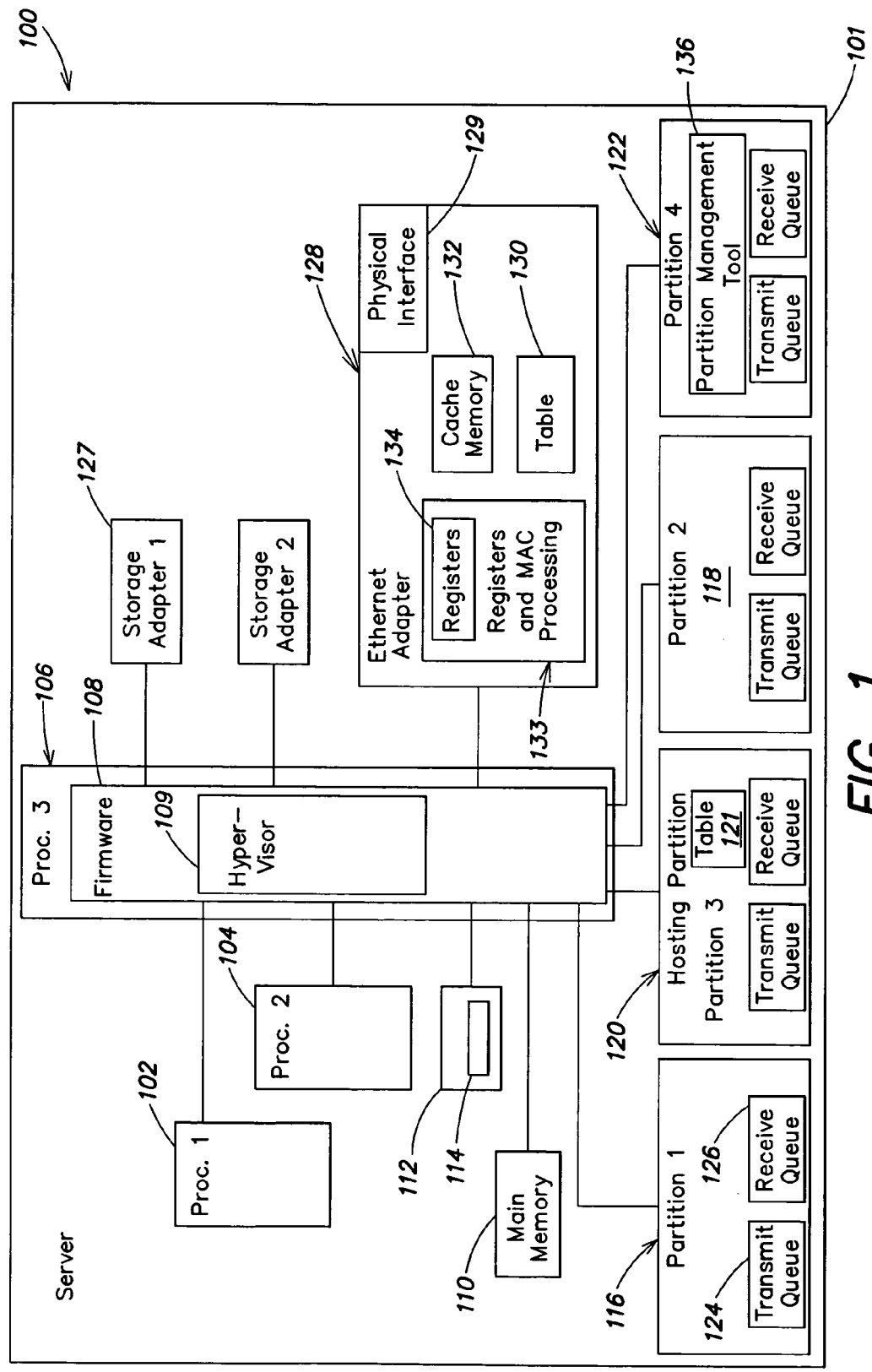
FIG. 1 is a block diagram of a computer system including a server, which includes an Ethernet adapter that may be shared by a plurality of partitions, in accordance with an embodiment of the present methods and apparatus.

FIG. 1 is a block diagram of a computer system 100 including a server 101 (e.g., computer server) which includes an Ethernet adapter that may be shared by a plurality of partitions, in accordance with an embodiment of the present methods and apparatus. The server 101 may include a plurality of processors 102, 104, 106 for executing instructions or code. In one embodiment, the server 101 may include up to 64 processors. Other numbers of processors may be used. One of the plurality of processors 102, 104, 106 may include and execute code, such as firmware 108. For example, the processor 106 may include and execute a Hypervisor function. Although the Hypervisor 109 shown in FIG. 1 is implemented on a single processor, in other embodiments, the Hypervisor 109 may use partitioned processors for Hypervisor functions. An example of the Hypervisor 109 may be IBM Hypervisor (hereinafter "Hypervisor") owned by IBM Corporation of Armonk, N.Y., which is the assignee of the present application. Hypervisor may be implemented using IBM iSeries or pSeries servers, for example. The server 101 may include a main memory 110 and a second memory 112, such as flash memory or NVRAM, which may be coupled to the firmware 108. The flash memory or NVRAM may store a configuration file 114 which affects the operation of the server 101. The configuration file 114 will be described in detail later.

The server 101 may include a plurality of partitions 116, 118, 120, 122 which may be coupled to the firmware 108. In one embodiment, the server 101 may include 256 or more partitions. The server may include other numbers of partitions 116, 118, 120, 122. Each partition 116, 118, 120, 122 may represent an OS instance on the server 101. For example, the plurality of partitions 116, 118, 120, 122 may represent an operating system, such as AIX, LINUX or OS400, executing on the server 101. Therefore, the server 101 may be a multiple partition server, such as a logically partitioned server (LPAR), for example. The plurality of partitions 116, 118, 120, 122 may represent other operating systems. More than one of the plurality of partitions 116, 118, 120, 122 may represent the same OSs. One or more of the plurality of partitions 116, 118, 120, 122 may include a transmit queue 124 and/or a receive queue 126. More specifically, for one or more of the plurality of partitions 116, 118, 120, 122, a portion of a partition memory included in the partition 116, 118, 120, 122 (e.g., actually a portion of the main memory that is allocated to each partition) may serve as the transmit queue 124 for storing frames or packets to be transmitted from the partition 116, 118, 120, 122. Another portion of the partition memory may serve as the receive queue 126 for storing frames or packets received by the partition 116, 118, 120, 122. Alternatively, the transmit queue 124 and the receive queue 126 may be stored in separate memories of the partition 116, 118, 120, 122.

The server 101 may include one or more adapters coupled to the firmware 108. The server 101 may include one or more input/output (I/O) adapters (e.g., storage adapters 127) for accessing storage devices coupled to and/or included in the server 101. The server 101 may include an adapter, such as a network adapter (e.g., a multiple queue Ethernet adapter 128), which may be used for receiving data for one or more of the partitions 116, 118, 120, 122 in the server 101 and/or transmitting data from one or more of the partitions 116, 118, 120, 122 from the server 101. Therefore, the multiple queue Ethernet adapter 128 may support a plurality of partitions 116, 118, 120, 122, each of which may include one or more pairs of transmit 124 and receive queues 126.

The Ethernet adapter 128 may include a physical interface 129 for connecting to an external connector (not shown), such as an Ethernet cable. The Ethernet adapter 128 may include (e.g., store) a table 130 for storing fields of information corresponding to the queues (e.g., transmit 124 and receive queues 126) included in one or more of the plurality of partitions 116, 118, 120, 122. Details of the structure of the table 130 included in the Ethernet adapter 128 will be described later with reference to FIG. 2. The Ethernet adapter 128 may include a cache memory 132 for temporarily storing frames or packets received by and/or to be transmitted from the server 101 and a component 133 for MAC processing that may include one or more registers 134 for storing data indicating a type of address to use for sorting frames or packets to be received by the plurality of partitions 116, 118, 120, 122 into appropriate receive queues 126 and/or sorting frames or packets from transmit queues 124 of the plurality of partitions 116, 118, 120, 122 into the cache memory 132 of the Ethernet adapter 128. For example, the one or more registers 134 may indicate the sorting of frames or packets received by the plurality of partitions 116, 118, 120, 122 is based on one or more Media Access Control (MAC) addresses, Virtual Local Area Network Identification (VLAN ID)/MAC address pairs or Internet Protocol (IP) addresses assigned to each of the plurality of partitions 116, 118, 120, 122. The value stored in the one or more registers 134 may be configured by a user, for example. An LPAR server may implement VLANs to simulate communication among a plurality of partitions included in the LPAR server as if the communication is conducted through actual LANs of multiple servers. A VLAN ID may be associated with one or more of the plurality of partitions.

One of the plurality of partitions 116, 118, 120, 122 may be a hosting partition 120. The hosting partition 120 controls (e.g., owns) the Ethernet adapter 128. The hosting partition 120 may share access to the Ethernet adapter 128 among other partitions in the plurality of partitions 116, 118, 120, 122. More specifically, the hosting partition 120 may allow other partitions 116, 118, 122 to receive and/or transmit frames or packets via the Ethernet adapter 128. The hosting partition 120 may include a table 121 which includes information about the partitions that may share access to the Ethernet adapter 128. The contents of table 121 are similar to the contents of table 130, which are described below.

One of the plurality of partitions 116, 118, 120, 122 may be employed as a partition management tool 136, for example, by executing software stored in the partition 122. The partition management tool 136 may be used for configuring partitions (e.g., new partitions) to share the Ethernet adapter 128 with the plurality of partitions 116, 118, 120, 122. The partition management tool may be used to configure the OS to run in the partition, the number of processors for the partition and the amount of main memory allocated to the partition, for example. As will be described further below, one or more of the plurality of partitions 116, 118, 120, 122 may be assigned one or more MAC addresses, VLAN ID/MAC address pairs and/or IP addresses. The partition management tool function may be implemented in an external personal computer or a rack mounted personal computer.

Figure 2:
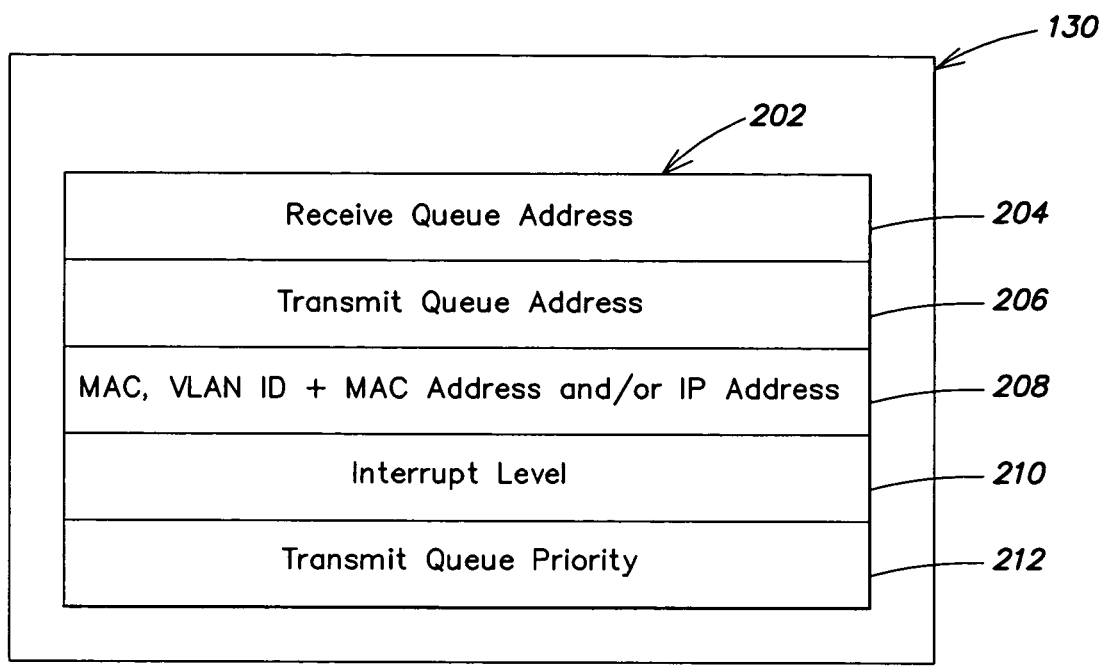
FIG. 2 is a block diagram of a table included in the adapter in accordance with an embodiment of the present methods and apparatus.

FIG. 2 is a block diagram of a table included (e.g., stored) in the Ethernet adapter 128. The table 130 may store information corresponding to the queues (e.g., transmit and/or receive queues) included in one or more of the plurality of partitions 116, 118, 120, 122. More specifically, the table 130 may include an entry 202 for each of the plurality of partitions 116, 118, 120, 122 which may share the Ethernet adapter 128. A table entry 202 corresponding to a partition 116, 118, 120, 122 may include a field 204 for storing an address of the receive queue 126 of the partition 116, 118, 120, 122. The receive queue address may indicate a portion of a partition memory included in the partition 116, 118, 120, 122 that may be used for storing the receive queue 126 corresponding to the partition 116, 118, 120, 122. Similarly, the table entry 202 corresponding to the partition 116, 118, 120, 122 may include a field 206 for storing an address of a transmit queue 124 of the partition 116, 118, 120, 122. The transmit queue address may indicate a portion of the partition memory used for storing the transmit queue 124 corresponding to the partition 116, 118, 120, 122. The table entry 202 corresponding to the partition 116, 118, 120, 122 may include a field 208 for storing one or more of any MAC addresses, VLAN ID/MAC address pairs, and/or IP addresses assigned to the partition 116, 118, 120, 122. One or more of the MAC address, VLAN ID/MAC address pairs, and/or IP addresses may be assigned (e.g., by the partition management tool 136) to the partition 116, 118, 120, 122, for example, during system configuration.

The entry 202 corresponding to the partition 116, 118, 120, 122 may include a field 202 for storing an interrupt level. The interrupt level may be, for example, one of a plurality (e.g., sixteen) of Message Signaling Interrupts (MSIS) included in a PCI bus protocol. The partition management tool may limit the maximum number of partitions allowed to share the Ethernet adapter to sixteen or another number. By using MSIs, the interrupt levels available to the Ethernet adapter 128 may not be limited to the number of interrupt lines coupled to the Ethernet adapter 128. The interrupt level may be used by the Ethernet adapter 128 to notify a partition 116, 118, 120, 122 that data has been added to the receive queue 126 for that partition 116, 118, 120, 122. The present methods and apparatus may implement other maximum numbers of MSIs (vectors).

The entry 202 corresponding to the partition 116, 118, 120, 122 may include a field 212 for storing a transmit queue priority 212. The Ethernet adapter 128 may use the transmit queue priority 212 stored in entries 202 corresponding to partitions 116, 118, 120, 122 which have frames or packets to transmit for determining from which partition 116, 118, 120, 122 data will be transmitted first.

Figure 3:
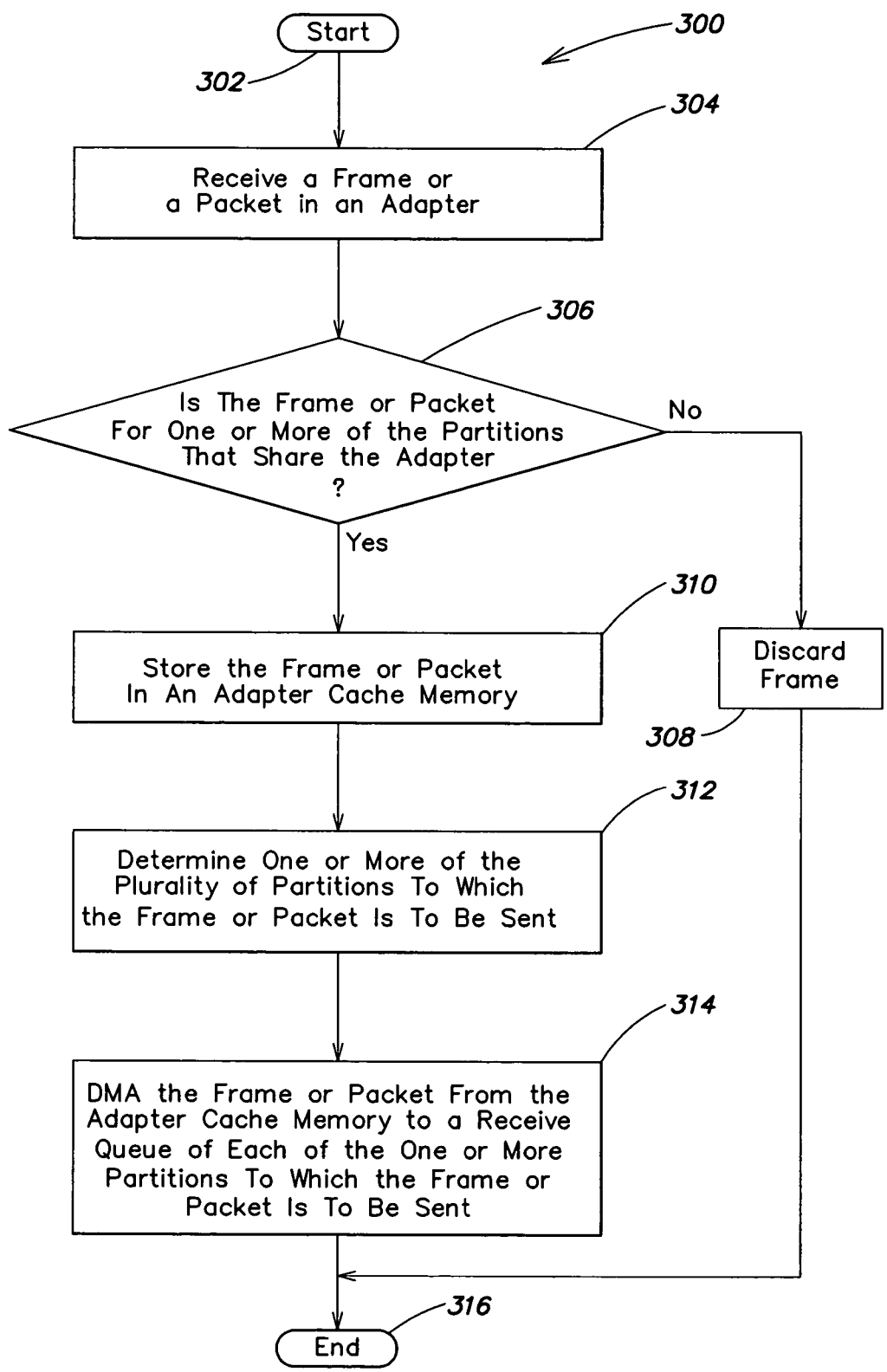
FIG. 3 illustrates a first exemplary method of sharing a multiple queue Ethernet adapter in accordance with an embodiment of the present methods and apparatus.

The operation of an apparatus (e.g., server) for sharing a multiple queue Ethernet adapter is now described with reference to FIGS. 1-2, and with reference to FIG. 3 which illustrates a first exemplary method of sharing a multiple queue Ethernet adapter 128. More specifically, the adapter may be a multiple queue Ethernet-protocol adapter within a multiple processor environment having multiple partitions. With reference to FIG. 3, in step 302, the method 300 begins. In step 304, a frame or packet may be received in an adapter (e.g., Ethernet adapter 128). A server 101 that includes the Ethernet adapter 128 may be coupled to a network connection (not shown). The server 101 may receive and/or transmit frames or packets using the network connection via the Ethernet adapter 128.

In step 306, it is determined whether the frame or packet is for one or more of the plurality of partitions 116, 118, 120, 122 (e.g., for an application running on one or the pluralities of partitions 116, 118, 120, 122) that share the Ethernet adapter 128. For example, as the frame or packet is received by the Ethernet adapter 128, the Ethernet adapter 128 may access a portion of the frame or packet, such as the MAC address included in the frame or packet. The Ethernet adapter 128 may determine whether such an address is known to the Ethernet adapter 128. For example, during system configuration, the partition management tool may be used for removing or assigning (e.g., dynamically) one or more MAC addresses, VLAN ID/MAC address pairs, and/or IP addresses to the Ethernet adapter 128. Such addresses may correspond to the addresses of partitions 116, 118, 120, 122 that may share the Ethernet adapter 128. In one embodiment, sixteen addresses may be assigned to the Ethernet adapter 128. Other numbers of addresses may be assigned to the Ethernet adapter 128. The Ethernet adapter 128 may access an address included in a received frame or packet and compare the accessed address to the one or more addresses assigned to the Ethernet adapter 128 to determine whether the frame or packet is for one or more (e.g., if the address included in the received frame or packet is determined to be a broadcast address) of the plurality of partitions 116, 118, 120, 122 that may share the Ethernet adapter 128. If the address (e.g., MAC address) included in the received frame or packet does not match an address known to the Ethernet adapter 128 and the received frame or packet is not a broadcast frame or packet, it is determined the frame or packet is not for one or more of the plurality of partitions 116, 118, 120, 122 that share the adapter (e.g., Ethernet adapter 128). Thereafter, step 308 is performed. In step 308, the frame or packet may be discarded by the Ethernet adapter 128.

Alternatively, if the address (e.g., MAC address) included in the received frame or packet matches an address known to the Ethernet adapter 128, step 310 may be performed. In step 310, the frame or packet may be stored in an adapter cache memory 132. More specifically, the Ethernet adapter 128 may receive the frame or packet and store one or more portions of the frame or packet in the cache memory 132. The cache memory 132 may store frames or packets to be transmitted from the server 101 via the Ethernet adapter 128. Thereafter, step 312 may be performed.

In step 312, one or more of the plurality of partitions 116, 118, 120, 122 to which the frame or packet is to be sent are determined. One or more registers 134 for storing a value indicating a type of address to use for determining one or more partitions to which the frame or packet is to be sent may be accessed. For example, the value stored in the one or more registers 134 may indicate the receive queue 126 of one or more partitions 116, 118, 120, 122 to which the frame or packet is to be determined based on a MAC address. A table 130 stored in the Ethernet adapter 128 may be accessed. Based on the data stored in the table 130 and/or the value stored in the one or more registers 134, one or more of the plurality of partitions 116, 118, 120, 122 to which the frame or packet is to be sent is determined. More specifically, the Ethernet adapter 128 may access one or more entries 202 (e.g., MAC address, VLAN ID/MAC address pair, IP address field 208 of one or more entries 202) of the table 130 for an address (e.g., MAC address) matching the address (e.g., MAC address) included in the received frame or packet. If a received frame or packet is not a broadcast frame or packet, the received frame or packet may be sent to a single partition 116, 118, 120, 122. More specifically, because an entry 202 stored in the table 130 may correspond to one of the plurality of partitions 116, 118, 120, 122 that may share the Ethernet adapter 128, the entry 202 which includes the matching address may identify the partition 116, 118, 120, 122 to which the frame or packet is to be sent. The Ethernet adapter 128 may access the receive queue address stored in the entry 202 including the matching address to determine the address of the receive queue for the partition 116, 118, 120, 122 corresponding to the entry 202. In this manner, frames or packets received by the Ethernet adapter 128 may be sorted (e.g., the receive queue of one or more partitions 116, 118, 120, 122 to which the frame or packet is to be sent may be determined) by an address (e.g., MAC address) stored in a table 130.

Although in the above example, received frames or packets are sorted by a MAC address, the received frames or packets may be sorted using other types of addresses included in the frame or packet and/or the table 130, such as VLAN ID/MAC address pair, or IP address. Frames or packets may be sorted based on other types of addresses (e.g., Ethertype addresses).

The Ethernet adapter 128 may access an address in a received frame or packet and determine the address is a broadcast address. Such an address indicates the frame or packet is destined for more than one partition 116, 118, 120, 122 included in the server 101. For example, if the Ethernet adapter 128 performs sorting based on a MAC address or a VLAN ID/MAC address pair, when the Ethernet adapter 128 accesses an address in a received frame or packet, the Ethernet adapter 128 may determine the frame or packet is an Address Resolution Protocol (ARP) or similar MAC or link layer broadcast frame or packet. Similarly, if the Ethernet adapter 128 performs sorting based on an IP address, when the Ethernet adapter 128 accesses an address in a received frame or packet, for example, the Ethernet adapter 128 may determine the received frame or packet is an IP broadcast frame or packet. As will be described further below, broadcast frames or packets may be DMAed to more than one partition 116, 118, 120, 122.

In step 314, the received frame or packet may be DMAed from the adapter cache memory to a receive queue of each of the one or more partitions to which the frame or packet is to be sent. Because the Ethernet adapter 128 may access the memory address of the receive queue of each of the one or more the partition 116, 118, 120, 122 to which the frame or packet is to be sent, the Ethernet adapter 128 may DMA the frame or packet from the adapter cache memory 132 to the receive queue 126 of each of the one or more partitions 116, 118, 120, 122 to which the frame or packet is to be sent.

Therefore, the frame or packet received by the Ethernet adapter 128 may be transmitted (e.g., DMAed) directly from the Ethernet adapter 128 to the one or more partitions 116, 118, 120, 122 to which the frame or packet is to be sent (e.g., for processing). More specifically, the Ethernet adapter 128 may DMA one or more receive descriptors from main memory 110 to the Ethernet adapter memory to determine a first available receive buffer for storing received data. The receive descriptors may be pointers or links to one or more receive buffers that are available for storing the received frame or packet. The Ethernet adapter 128 may select a receive buffer (e.g., in first-in first-out (FIFO) order) and DMA the received frame or packet into the receive buffer (e.g., into a portion of main memory allocated to serve as the partition memory for the partition to which the frame or packet is to be sent).

Once a frame or packet is DMAed to the receive queue 126 of a partition 116, 118, 120, 122, a device driver of the partition 116, 118, 120, 122 may receive the frame or packet and pass the frame or packet up the layers of a TCP/IP stack of the partition 116, 118, 120, 122. In this manner, the partition 116, 118, 120, 122 may transmit the frame or packet to an appropriate application running on the partition 116, 118, 120, 122 (e.g., for processing).

When the Ethernet adapter 128 performs sorting of received frames or packets based on a MAC address, and in step 312, the Ethernet adapter 128 determines a received frame or packet is an ARP or similar MAC or link layer broadcast frame or packet, the Ethernet adapter 128 may DMA the broadcast frame or packet from the adapter cache memory 132 to the receive queue of more than one (e.g., each) partition 116, 118, 120, 122 included in the server 101. Because the Ethernet adapter 128 may not know which partitions 116, 118, 120, 122 need to process an ARP or similar MAC or link layer broadcast frame or packet, the Ethernet adapter 128 may DMA such a frame or packet to the receive queue of each partition 116, 118, 120, 122 included in the server 101.

When the Ethernet adapter 128 performs sorting of received frames based on a VLAN ID/MAC address pair, and in step 312, the Ethernet adapter 128 determines a received frame is an ARP or similar MAC or link layer broadcast frame or packet, the Ethernet adapter 128 may DMA the broadcast frame or packet from the adapter cache memory 132 to the receive queue of more than one partition 116, 118, 120, 122 included in the server 101. More specifically, the Ethernet adapter 128 may DMA the broadcast frame or packet from the adapter cache memory 132 to the receive queue of each partition 116, 118, 120, 122 with the same VLAN ID. Because the Ethernet adapter may not know which partitions within the VLAN ID need to process the ARP or similar MAC or link layer broadcast frame or packet, the Ethernet adapter 128 DMAs such a frame or packet to the receive queue of each partition that includes the same VLAN ID as the frame or packet.

Similarly, when the Ethernet adapter 128 performs sorting of received frames or packets based on an IP address, and in step 312, the Ethernet adapter 128 determines a received frame is an IP broadcast frame or packet, the Ethernet adapter 128 may DMA the IP broadcast frame or packet to the receive queue of more than one (e.g., each) partition 116, 118, 120, 122 included in the server 101. Because the server 101 may not know which frames or packets need to process the IP broadcast frame or packet (e.g., packet), the Ethernet adapter 128 may DMA such a frame or packet to the receive queue of each partition 116, 118, 120, 122 included in the server 101.

Alternatively, a subnet mask may be used (e.g., assigned during system configuration), such that the Ethernet adapter 128 may only need to DMA such a frame or packet to the receive queues of a subset of the partitions 116, 118, 120, 122 included in the server 101. More specifically, the Ethernet adapter 128 may only need to DMA such a frame or packet to the partitions 116, 118, 120, 122 assigned an IP address included in an IP subnet to which the IP broadcast frame is destined. In this manner, subnet masks may be used to intelligently limit IP broadcast frames or packets (e.g., packets) to selected receive queues.

Thereafter, step 316 may be performed. In step 316, the method 300 ends.

After the Ethernet adapter 128 DMAs one or more new frames or packets to a receive queue 126 corresponding to a partition 116, 118, 120, 122, the Ethernet adapter 128 may generate an interrupt to notify the partition 116, 118, 120, 122 of the one or more newly received frames or packets. For example, the Ethernet adapter may generate an interrupt when the number of received frames or packets for a queue reaches a threshold or a timer expires with at least one frame received. More specifically, the Ethernet adapter 128 may access the entry 202, which corresponds to the partition 116, 118, 120, 122, stored in the table 130 to determine the interrupt level (e.g., MSI level) corresponding to the partition 116, 118, 120, 122. Therefore, the Ethernet adapter 128 may assert an MSI which indicates to the server 101 that a partition 116, 118, 120, 122 may need to process one or more frames or packets.

Through the use of the method 300 of FIG. 3, an adapter (e.g., a multiple queue Ethernet adapter 128) may be shared by a plurality of partitions 116, 118, 120, 122, each of which represents a separate OS, to receive frames or packets of data. More specifically, the Ethernet adapter 128 may sort newly received frames or packets based on an address included in the frames or packets such that newly received frames or packets may be directly transmitted to the partition 116, 118, 120, 122 to which the frames or packets are to be sent (e.g., for processing).

Figure 4:
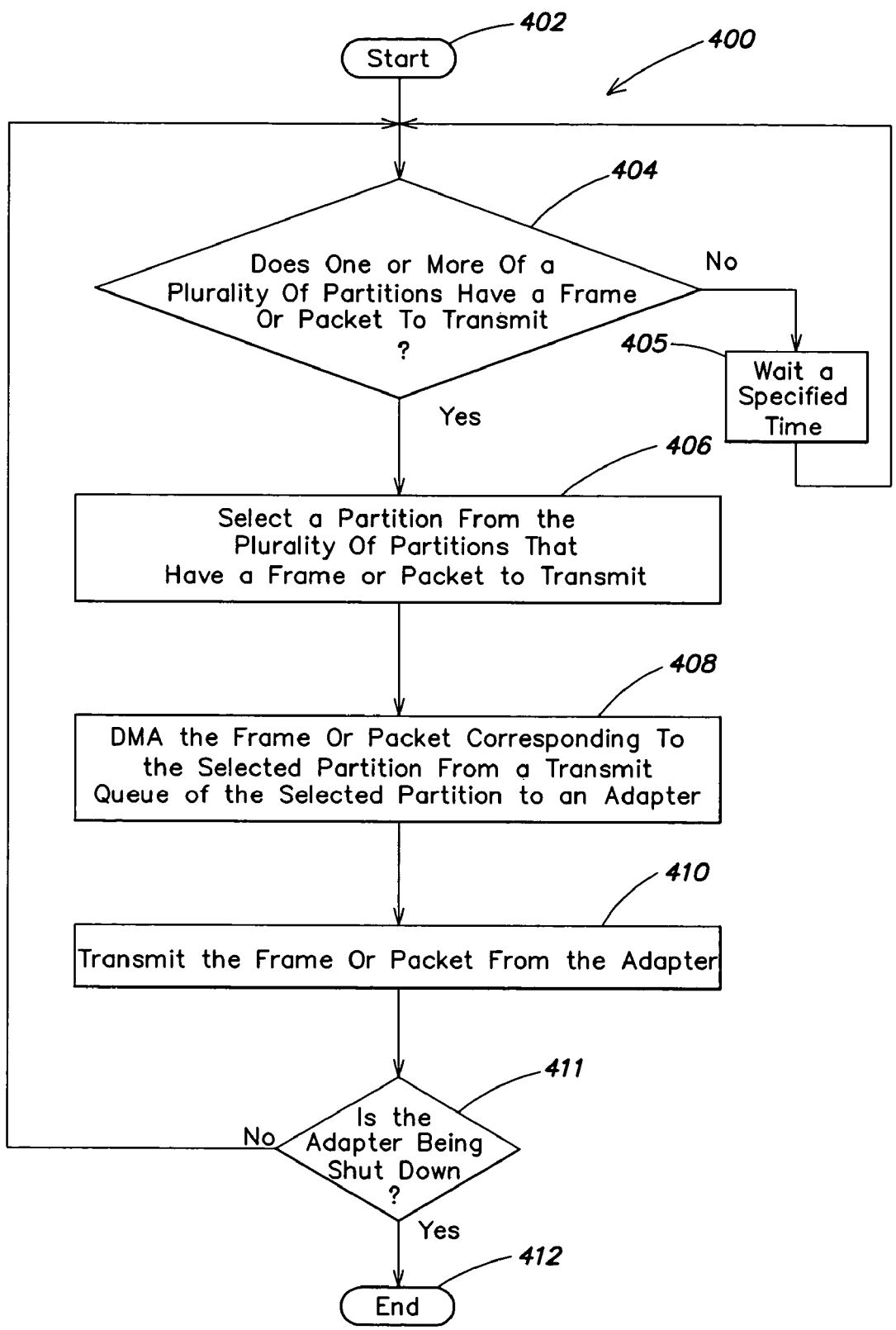
FIG. 4 illustrates a second exemplary method of sharing a multiple queue Ethernet adapter in accordance with an embodiment of the present methods and apparatus.

The operation of an apparatus (e.g., server) for sharing a multiple queue Ethernet adapter 128 is now described with reference to FIGS. 1-2, and with reference to FIG. 4 which illustrates a second exemplary method of sharing a multiple queue Ethernet adapter 128. With reference to FIG. 4, in step 402, the method 400 begins. In step 404, it is determined whether one or more of a plurality of partitions 116, 118, 120, 122 have a frame or packet to transmit. For example, when the amount of data, which is to be transmitted from the server 101, stored in a cache memory 132 of the Ethernet adapter 128 falls below a threshold (e.g., a pre-determined level), the Ethernet adapter 128 may poll a transmit queue 124 corresponding to one or more (e.g., each) of the plurality of partitions 116, 118, 120, 122 that share the Ethernet adapter 128. The Ethernet adapter 128 may access one or more entries 202 of a table 130, which stores fields of information corresponding to the queues included in one or more of the plurality of partitions 116, 118, 120, 122 that may share the Ethernet adapter 128. More specifically, the Ethernet adapter 128 may access the transmit queue address field 206 and the MAC address, VLAN ID/MAC address pair and/or IP address field 208 of one or more (e.g., each) entries 202 included in the table 130 to determine the plurality of partitions 116, 118, 120, 122 that may share the Ethernet adapter 128 and the field 206 storing the memory address of the transmit queue 124 for each such partition 116, 118, 120, 122. The Ethernet adapter 128 may then poll the memory address of the transmit queue 124 for each of the plurality of partitions 116, 118, 120, 122 that may share the Ethernet adapter 128.

The Ethernet adapter 128 may determine one or more of the plurality of partitions 116, 118, 120, 122 have a frame or packet to be transmitted based on polling results from one or more of the plurality of partitions 116, 118, 120, 122 (e.g., polling results from a transmit queue corresponding to each of the plurality of partitions 116, 118, 120, 122). Adapter polling may be employed by checking the transmit queue 124 of one or more partitions 116, 118, 120, 122 to determine if frames or packets are waiting (e.g., need) to be transmitted. Alternatively, a partition 116, 118, 120, 122 may indicate transmit frames or packets are ready to be transmitted by writing to a register.

If it is determined, in step 404, no frames or packets need to be transmitted from the plurality of partitions 116, 118, 120, 122, step 405 may be performed. In step 405, the Ethernet adapter 128 may wait an amount of time specified by a time delay, for example. The time delay may be 500 ns. A longer or shorter time delay may be used. Thereafter, step 404 may be performed.

Alternatively, if it is determined, in step 404, one or more of the plurality of partitions 116, 118, 120, 122 have a frame or packet to transmit, step 406 may be performed. In step 406, a partition from the plurality of partitions that have a frame or packet to transmit may be selected. More specifically, the Ethernet adapter 128 may select one of the partitions that has a frame or packet to transmit. If a plurality of partitions have a frame or packet to transmit, the Ethernet adapter 128 may access the table 130, which stores fields of information corresponding to the queues included in one or more of the plurality of partitions 116, 118, 120, 122 that share the Ethernet adapter 128 and select a partition from the plurality of partitions that have a frame to transmit based on data stored in the table 130. More specifically, the Ethernet adapter 128, may access an entry 202, which corresponds to each of the plurality of partitions that have a frame or packet to transmit, stored in the table 130. Based on a value stored in the transmit queue priority field 212 of each such entry 202, the Ethernet adapter 128 may select a partition 116, 118, 120, 122 from which to transmit a frame or packet. The Ethernet adapter 128 may use other methods for selecting a partition from the plurality of partitions that have a frame or packet to transmit. Alternatively, if only one partition has a frame or packet to transmit, the Ethernet adapter 128 may select the partition.

In step 408, the frame or packet corresponding to the selected partition may be DMAed from a transmit queue 124 of the selected partition to the Ethernet adapter 128. The Ethernet adapter 128 may access the transmit queue address field 206 of the entry 202, which corresponds to the selected partition, stored in the table 130 to determine the address of the transmit queue 124 from which a frame or packet is to be DMAed. The Ethernet adapter 128 may DMA the frame or packet from the transmit queue 124 of the selected partition to the cache memory 132 of the Ethernet adapter 128. More specifically, the Ethernet adapter 128 may DMA one or more transmit descriptors (if any) from main memory 110 to the Ethernet adapter memory to determine transmit buffers storing frames or packets to be transmitted. The transmit descriptors may be pointers or links to one or more transmit buffers that store a frame or packet to be transmitted. The Ethernet adapter may select a transmit buffer (e.g., in FIFO order) and DMA the transmit buffer into the Ethernet adapter cache memory. The Ethernet adapter 128 may assert an interrupt for the partition 116, 118, 120, 122 including the transmit queue 124 from which the frame or packet is DMAed.

A partition 116, 118, 120, 122 may transmit a frame or packet intended for another partition that shares the adapter 128. The adapter 128 may detect the transmit frame or packet is intended for another partition 116, 118, 120, 122 that shares the adapter 128 and send the frame or packet to the receive queue of that partition 116, 118, 120, 122.

Similar to the method described above for determining whether a received frame or packet is a broadcast frame or packet, the Ethernet adapter 128 may determine whether the frame or packet DMAed from the transmit queue 124 of the selected partition 116, 118, 120, 122 to the cache memory 132 is a broadcast frame or packet. If the frame or packet is a broadcast frame or packet, the Ethernet adapter 128 may DMA the broadcast frame or packet to the receive queue 126 of one or more partitions 116, 118, 120, 122 included in the server 101 (e.g., all partitions that share the adapter except for the partition that transmitted the broadcast frame or cell). As described above, the receive queue 126 of the one or more partitions 116, 118, 120, 122 to which the frame or packet is DMAed depends on the type of sorting (e.g., address sorting) performed and/or the address assigned to the plurality of partitions 116, 118, 120, 122.

In step 410, the frame or packet may be transmitted from the adapter (e.g., Ethernet adapter 128). More specifically, frames or packets may be transmitted from the server 101 using a network connection (not shown) via the Ethernet adapter 128 or to another partition 116, 118, 120, 122 that shares the Ethernet adapter 128. If the frame or packet is a broadcast frame or packet, the adapter 128 may DMA the broadcast frame or packet to the receive queue of one or more partitions 116, 118, 120, 122 as described above. The frames or packets may be transmitted from the server 101 in the order in which the frames or packets to be transmitted were stored by the cache memory 132 of the Ethernet adapter 128. Other methods may be used by the Ethernet adapter 128 for determining which frame or packet to transmit next from the server 101.

Thereafter, step 411 may be performed. In step 411, it is determined whether the Ethernet adapter 128 is being shut down. If it is determined, in step 410, the Ethernet adapter 128 is not being shut down, step 404 may be performed. The details of step 404 were described in detail above and will not be described again herein. Alternatively, if it is determined, in step 410, the Ethernet adapter 128 is being shut down, step 412 may be performed. As stated, in step 412, the method 400 ends. Through the use of the method of FIG. 4, an adapter (e.g., a multiple queue Ethernet adapter 128) may be shared by a plurality of partitions 116, 118, 120, 122, each of which represent a separate OS, to transmit frames or packets of data. More specifically, the Ethernet adapter 128 may select frames or packets from a transmit queue 124 corresponding to a partition 116, 118, 120, 122 based on an address of the partition 116, 118, 120, 122 and/or a priority assigned to the transmit queue of the partition, which may be stored in a table entry 202 that corresponds to the partition 116, 118, 120, 122. In this manner, a frame or packet to be transmitted from the server 101 may be DMAed directly from a transmit queue 124 to the Ethernet adapter 128 from which the frame or packet may be transmitted from the server 101.

A server 101, which may operate as or may be included in a computer system 100 that includes the Ethernet adapter 128, may perform the method 300 and/or the method 400. More specifically, the computer system 100 or server 101 may employ a receive queue and a transmit queue for each of a plurality of partitions 116, 118, 120, 122 included in the computer system 100. The Ethernet adapter may DMA a frame or packet from a transmit queue 124 of one or more of the plurality of partitions 116, 118, 120, 122 to an adapter (e.g., Ethernet adapter 128) cache memory in the manner described above with reference to FIG. 4 and/or DMA data from the Ethernet adapter 128 to a receive queue 126 of one or more of the plurality of partitions 116, 118, 120, 122 in the manner described above with reference to FIG. 3.

As stated above, using the present methods and apparatus, newly received frames or packets may be transmitted directly from the Ethernet adapter 128 to the partition 116, 118, 120, 122 to which the frames or packets are to be sent (e.g., for processing) and/or frames or packets to be transmitted from the server 101 may be DMAed directly from a transmit queue 124 of a partition 116, 118, 120, 122 to the Ethernet adapter 128. Because the present methods and apparatus do not require all frames or packets received by and/or to be transmitted from the server 101 via the Ethernet adapter 128 to be received by a hosting partition 120 and does not require the hosting partition 120 to perform a store-and-forward operation on the received frames or packets, the present methods and apparatus avoid the disadvantages (e.g., increased delays and processor utilization) associated with the prior art described above. Therefore, the present methods and apparatus may be used for driving the Ethernet adapter 128 at a high speed (e.g., a speed at or near the maximum capacity of the Ethernet adapter 128). Consequently, the maximum data throughput of the server 101, which includes the Ethernet adapter 128, may be increased.

Figure 5:
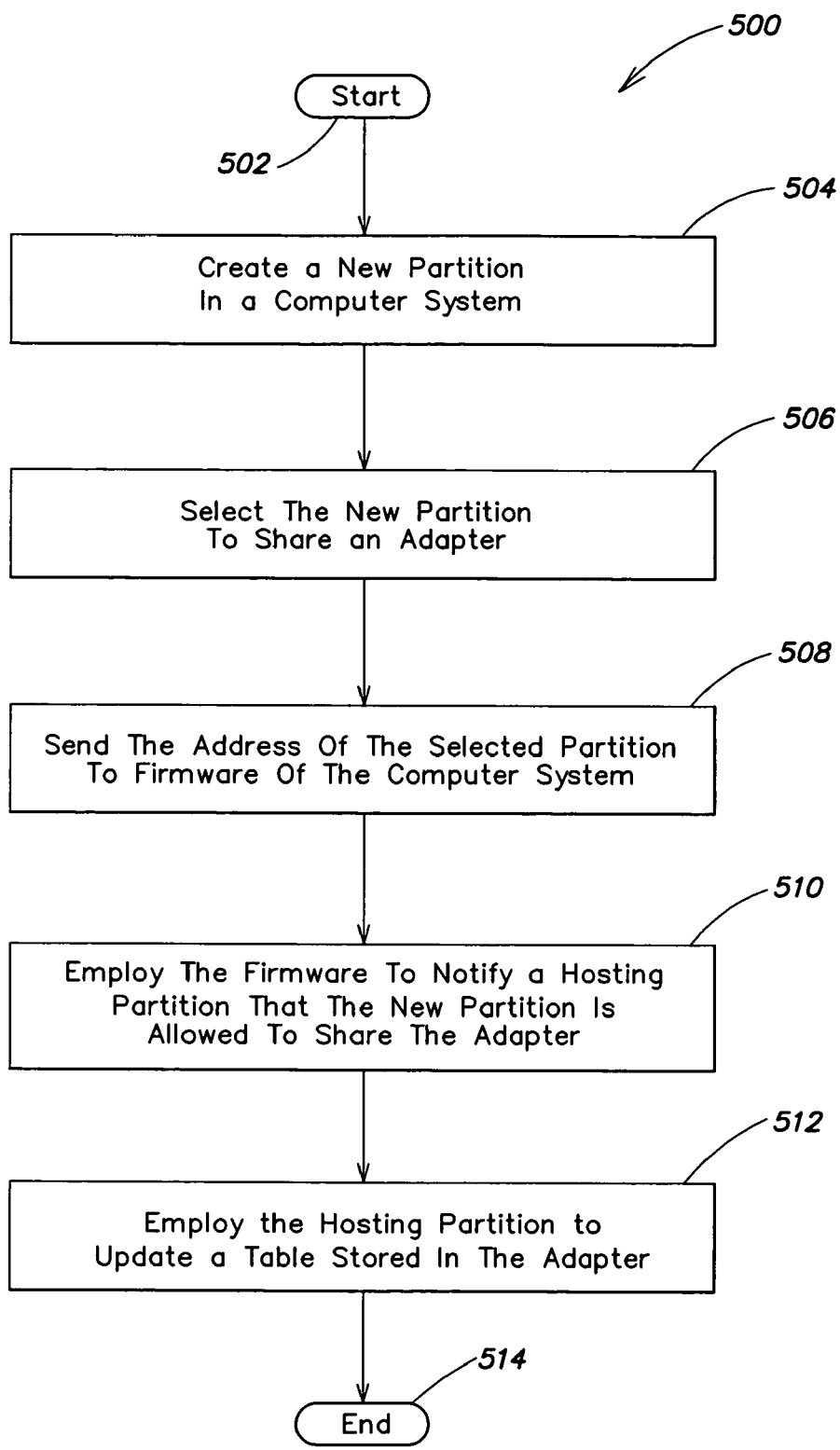
FIG. 5 illustrates a method of configuring a plurality of partitions of a computer system to share a multiple queue Ethernet adapter in accordance with an embodiment of the present methods and apparatus.

The operation of a computer system 100 for configuring multiple logical partitions to share an adapter (e.g., a multiple queue Ethernet adapter 128) is now described with reference to FIG. 5, which illustrates a method of configuring a plurality of partitions 116, 118, 120, 122 of a computer system 100 to share a multiple queue Ethernet adapter 128. With reference to FIG. 5, in step 502, the method 500 begins. In step 504, a new partition (e.g., 118) in a computer system 100 is created. For example, a user, such as a system administrator, may create a new partition (e.g., OS instance) on a server 101 included in and/or operating as the computer system 100. For example, the server 101 may include a partition (e.g., 122) which may run one or more applications on the server 101. Such applications may enable the partition (e.g., 122) to operate as a partition management tool 136. The partition management tool 136 may be used for creating the new partition. Other methods may be used for creating the new partition on the server 101.

Steps 504-512 may be used for allowing the new partition (e.g., 118) to share the multiple queue Ethernet adapter 128 with one or more other partitions. In step 504, the new partition (e.g., 118) may be selected to share the Ethernet adapter 128. More specifically, a user may employ the partition management tool 136 to select the new partition and assign one or more of MAC addresses, VLAN ID/MAC address pairs and IP addresses to the new partition. The partition management tool 136 may be used for further configuring the new partition. For example, the partition management tool 136 may be used for assigning a receive queue address, transmit queue address, interrupt level (e.g., MSI level) and/or a transmit queue priority for the new partition.

The partition management tool 136 may create or update a configuration file 114 which stores partition configuration information. The configuration file 114 may be stored in flash memory or NVRAM 112. The firmware 108 may access the configuration file 114 to determine how the server resources are to be shared by the partitions 116, 118, 120, 122 and what OS to boot for each partition 116, 118, 120, 122. For example, the firmware 108 may determine the amount of processing, memory (e.g., main memory) and I/O adapter (e.g., storage adapter) resources available to each partition 116, 118, 120, 122 based on the configuration file 114. The firmware 108 may allocate such resources to the partitions 116, 118, 120, 122 based on the configuration file 114.

In step 508, the address of the selected partition may be sent to the firmware 108 of the computer system 100. For example, the partition management tool 136 may send one or more of the MAC addresses, VLAN ID/MAC address pairs and/or IP addresses assigned to the new partition to the firmware 108. The partition management tool 136 may send one or more of the receive queue address, transmit queue address, MSI level and/or the transmit queue priority of the new partition to the firmware 108.

In step 510, the firmware may be employed to notify a hosting partition 120 that the new partition is allowed to share the adapter. The firmware 108 may send the information received from the partition management tool 136 to the hosting partition 120. As stated above, the hosting partition 120 may control (e.g., own) the Ethernet adapter 128 and may share access to the Ethernet adapter 128 among other partitions 116, 118, 120, 122. The hosting partition 120 may include a table 121 which includes information about the plurality of partitions 116, 118, 120, 122 that may share access to the Ethernet adapter 128. The hosting partition 120 may update the table 121 with the information provided by the firmware 108. In this manner, the table 121 may include a receive queue address, transmit queue address, MAC address, VLAN ID/MAC address pair, and/or IP address, MSI level, and/or a transmit queue priority corresponding to each partition 116, 118, 120, 122 that may share the Ethernet adapter 128.

In step 512, a table stored in the adapter may be updated. As stated above, the Ethernet adapter 128 may store information about the queues corresponding to each partition 116, 118, 120, 122 that shares the Ethernet adapter 128 in a table 130. The structure of the table 130 was described in detail with reference to FIG. 2 and is not described herein. The hosting partition 120 may update, for example, dynamically, the table 130 to include the information corresponding to the new partition (e.g., 118). The hosting partition 120 may update the table 130 stored in the Ethernet adapter 128 with the table 121 stored in the hosting partition 120. The Ethernet adapter 128 may sort frames or packets based on the updated information stored in the table 130. In this manner, while performing the methods 300, 400 of the present invention, the Ethernet adapter 128 may be aware of all partitions (e.g., including newly-added partitions) 116, 118, 120, 122 of the server 120 that may share the Ethernet adapter 128 (e.g., that may receive and/or transmit frames or packets from the server 101 via the Ethernet adapter 128). The new partition may have a MAC address, which may be assigned by the hosting partition 120.

In step 514, the method 500 ends. Through the use of the method 500 of FIG. 5, a plurality of partitions 116, 118, 120, 122 of a computer system 100 may be configured to share an adapter (e.g., multiple queue Ethernet adapter 128) such that the computer system 100 may drive the Ethernet adapter 128 at a high speed (e.g., a speed at or near the maximum speed at which the Ethernet adapter 128 may operate).

The foregoing description discloses only exemplary embodiments of the invention. Modifications of the above disclosed apparatus and methods which fall within the scope of the invention will be readily apparent to those of ordinary skill in the art. For instance, although one or more embodiments are described in which the adapter receives and transmits Ethernet protocol frames, the adapter of the present apparatus and methods may be used for receiving and transmitting frames of other protocols. For example, the present methods and apparatus may be used for receiving and transmitting a frame or packet of an internet small computer system interface (iSCSI) protocol, which allows SCSI commands to be included inside a TCP/IP frame or packet and therefore, implemented across an Ethernet network. Although in one or more embodiments, Transport Control Protocol/Internet Protocol (TCP/IP) processing may be performed in a partition 116, 118, 120, 122, in other embodiments, the Ethernet adapter 128 may include a TCP/IP Offload Engine (TOE) which performs much of the TCP/IP processing. Partitions 116, 118, 120, 122 of a server 101, which includes an Ethernet adapter 128 with TOE, may be assigned a MAC address and/or an IP address. Further, the present apparatus and methods may be implemented using PCI, PCI-X, PCI-X ddr, PCI Express or other Ethernet adapters.

Although in the above embodiments the table 121 and table 130 store fields such as a receive queue address 204, transmit queue address 206, MAC address, VLAN ID/MAC address pair and/or IP address 208, interrupt (e.g., MSI) level 210, and a transmit queue priority 212, in other embodiments, more, less or different fields may be stored in the table 121, 130. Although in the above embodiments, firmware 108, such as Hypervisor, is used to manage the resources of the computer system 100 (e.g., server 101), in other embodiments, different software may be used.

Accordingly, while the present invention has been disclosed in connection with exemplary embodiments thereof, it should be understood that other embodiments may fall within the spirit and scope of the invention, as defined by the following claims.

The invention claimed is:

1. A method for sharing a multiple queue Ethernet adapter comprising:

receiving a frame or packet in the adapter;

determining whether the frame or packet is for one or more of a plurality of partitions that share the adapter; and if the frame or packet is for one or more of the plurality of partitions that share the adapter:

storing the frame or packet in an adapter cache memory;

determining one or more of the plurality of partitions to which the frame or packet is to be sent; and transferring the frame or packet from the adapter cache memory directly to a receive queue of each of the one or more partitions to which the frame or packet is to be sent wherein determining one or more of the plurality of partitions to which the frame or packet is to be sent further comprises:

accessing a value stored in a register, the value indicating a type of address to use for determining one or more of the plurality partitions to which the frame or packet is to be sent;

accessing a table stored in the adapter; and determining one or more of the plurality of partitions to which the frame or packet is to be sent based on the value stored in the register and data stored in the table.

2. The method of claim 1 further comprising, if the frame or packet is for one or more of the plurality of partitions that share the adapter, generating an interrupt to notify each of the one or more partitions to which the frame or packet is transferred of the frame or packet.

3. The method of claim 2 wherein generating an interrupt to notify each of the one or more partitions to which the frame or packet is transferred of the frame or packet includes generating a Message Signaling Interrupt (MSI) to notify each of the one or more partitions to which the frame or packet is transferred of the frame or packet.

4. The method of claim 1 wherein determining one or more of the plurality of partitions to which the frame or packet is to be sent includes:
   accessing a table stored in the adapter; and
   determining one or more of the plurality of partitions to which the frame or packet is to be sent based on data stored in the table.

5. The method of claim 4 wherein determining one or more of the plurality of partitions to which the frame or packet is to be sent based on data stored in the table includes determining one or more of the plurality of partitions to which the frame or packet is to be sent based on at least one of a MAC address, VLAN ID/MAC address pair and an IP address stored in the table.

6. The method of claim 1 wherein:
   determining whether the frame or packet is for one or more of a plurality of partitions that share the adapter includes determining the frame or packet is a broadcast frame or packet; and
   transferring the frame or packet from the adapter cache memory to a receive queue of each of the one or more partitions to which the frame or packet is to be sent includes transferring the broadcast frame or packet from the adapter cache memory to a receive queue of all of the plurality of partitions that share the adapter.

7. A method of sharing a multiple queue Ethernet adapter comprising:
   employing a receive queue and a transmit queue for each of a plurality of partitions included in a computer system; and
   at least one of transferring a frame or packet from the transmit queue of one of the plurality of partitions directly to the adapter cache memory, and transferring a frame or packet from the adapter directly to the receive queue of one of the plurality of partitions
   wherein transferring a frame or packet from the transmit queue of one of the plurality of partitions to the adapter cache memory includes:
      accessing a table stored in the adapter; and
      transferring a frame or racket from the transmit queue of one of the plurality of partitions to the adapter cache memory based on data stored in the table; and
   wherein transferring a frame or packet from the adapter to the receive queue of one of the plurality of partitions includes:
      accessing the table stored in the adapter; and
      transferring a frame or packet from the adapter to the receive queue of one of the plurality of partitions based on data stored in the table.

8. A method of configuring a plurality of partitions of a computer system to share a multiple queue Ethernet adapter comprising:
   creating a new partition in the computer system; and
   allowing the new partition to directly share the adapter with one or more other partitions of the computer system
   wherein allowing the new partition to share the adapter with one or more other partitions of the computer system includes:
      selecting the new partition to share the adapter;
      sending the address of the selected partition to a firmware of the computer system;
      employing the firmware to notify a hosting partition that the new partition is allowed to share the adapter; and
      updating a table stored in the adapter, the table storing information about the queues corresponding to each partition that shares the adapter.

9. The method of claim 8 further comprising notifying the firmware of an interrupt corresponding to the new partition.

10. The method of claim 8 further comprising updating a table stored in the hosting partition.

11. The method of claim 10 wherein updating the table stored in the adapter includes updating the table stored in the adapter with the table stored in the hosting partition.

* * * * *

UNITED STATES PATENT AND TRADEMARK OFFICE
CERTIFICATE OF CORRECTION

| | | |
|---|---|---|
| PATENT NO. | : 7,660,322 B2 | Page 1 of 1 |
| APPLICATION NO. | : 10/733754 | |
| DATED | : February 9, 2010 | |
| INVENTOR(S) | : Kiel et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1264 days.

Signed and Sealed this

Thirtieth Day of November, 2010

David J. Kappos
*Director of the United States Patent and Trademark Office*